Patented May 1, 1945

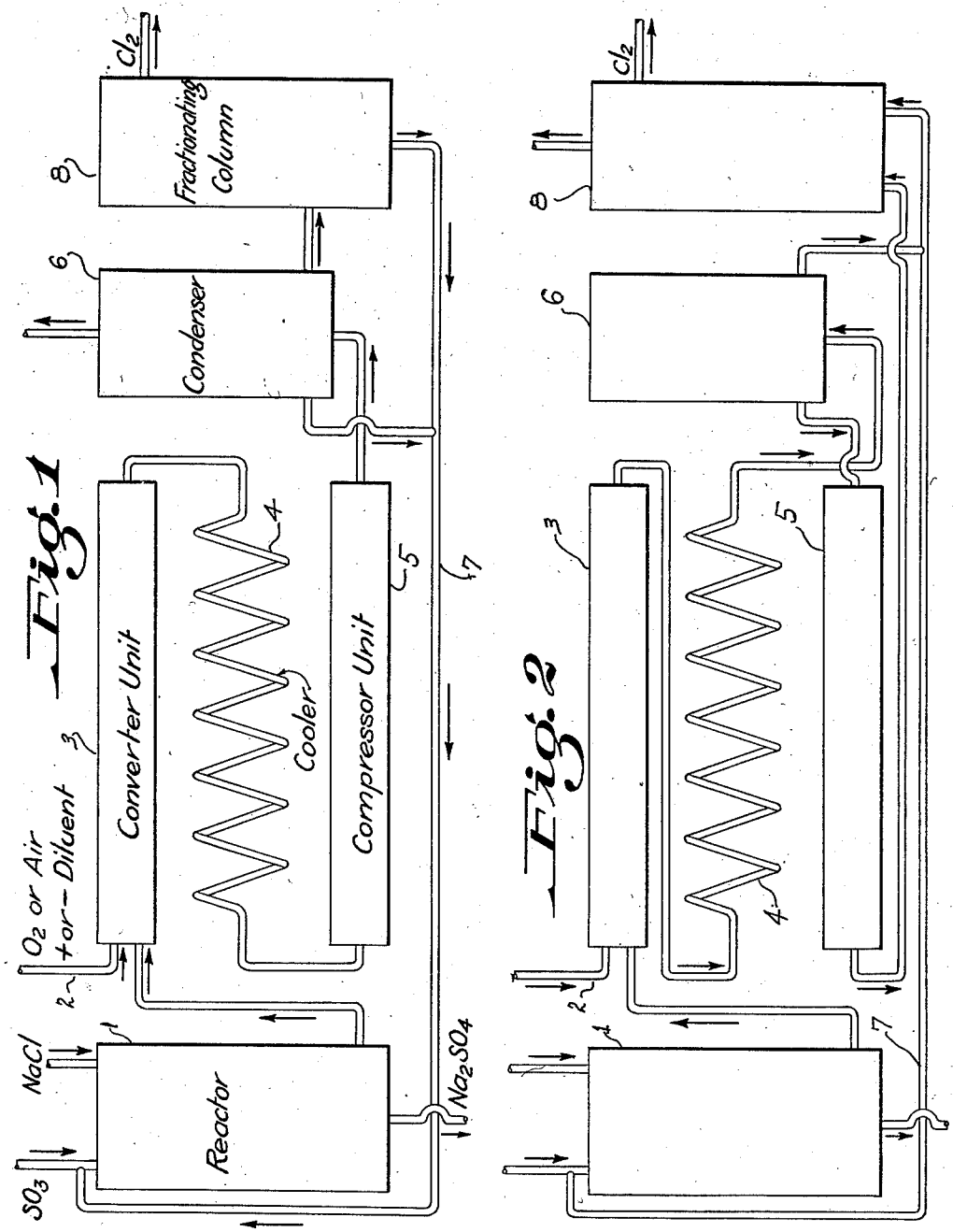

2,375,001

UNITED STATES PATENT OFFICE 2,375,001

MANUFACTURE OF CHLORINE AND SODIUM SULPHATE

Ralph K. Iler, East Cleveland, Ohio, assignor to E. I. du Pont de Nemours & Company, Wilmington, Del., a corporation of Delaware Application December 23, 1939, Serial No. 310,837

7 Claims. (Cl. 23—219)

This invention relates to the manufacture of chlorine and is particularly directed to the recovery of chlorine from mixtures of sulphur dioxide and chlorine as obtained by the action of sulphur trioxide on sodium chloride. More particularly this invention is directed to processes in which sulphur trioxide is caused to act on sodium chloride to liberate equimolecular amounts of sulphur dioxide and chlorine. The sulphur dioxide-chlorine mixture is subjected to catalysis to oxidize the sulphur dioxide to sulphur trioxide and sulphur trioxide is separated by cooling the resulting gas mixture to a temperature below the boiling point or sublimation point (vaporization point) of sulphur trioxide at the pressure obtaining, and separating the condensed sulphur trioxide from the other phases.

It has long been recognized as desirable to produce chlorine and sodium sulphate by reacting sulphur trioxide with common salt, and divers processes have been suggested for accomplishing this end. Yet the fact that none of these suggestions have proved of practical value suggests that in some aspects at least the processes were impractical, and I find that one of the reasons lies in the failure of the prior art to provide any practical method of separating the equimolecular mixtures of sulphur dioxide and chlorine which results from the reaction of salt and sulphur trioxide, either directly at appropriate temperatures or through the decomposition of an intermediate product, sodium chlorosulphonate. Thus, it has been proposed to make chlorine and salt cake (sodium sulphate) by passing sulphur trioxide through towers packed with salt, passing the resulting mixture in the presence of air or oxygen in contact with a material adapted to catalyze the reaction sulphur dioxide to sulphur trioxide, passing the resulting mixture again in contact with sodium chloride whereby the sulphur trioxide is caused to react with the salt to form more sodium sulphate, sulphur dioxide, chlorine, and so on, until the sulphur dioxide in the gas is reduced to a nominal figure. Such processes, however, cannot produce a sulphur dioxide-free gas because each step for the removal of sulphur trioxide is accompanied by the formation of sulphur dioxide. It has also been proposed to separate sulphur dioxide and chlorine by liquefaction and fractional distillation, but complete separation is difficult to obtain by this procedure and the by-product sulphur dioxide is of little value by itself.

I have now found that chlorine and sodium sulphate may be produced simply and effectively by causing sulphur trioxide to act on sodium chloride in a manner to produce a gaseous mixture composed essentially of equimolar quantities of sulphur dioxide and chlorine, adding oxygen to the mixture, catalytically oxidizing the sulphur dioxide to sulphur trioxide, cooling the resulting mixture to a temperature below the vaporization point of sulphur trioxide under the conditions of partial pressure of sulphur trioxide existing in the system and separating sulphur trioxide from the remaining phases. I have found that by cooling a gaseous mixture of sulphur trioxide and chlorine to effect condensation of one or more of the constituents, two phases, one rich in chlorine and the other rich in sulphur trioxide are formed which can readily be separated mechanically or by fractional distillation, depending upon the nature of the phases, and by suitably choosing conditions of temperature and pressure the phases may be liquid-gas, solid-gas, solid-liquid, or liquid-liquid. For example, sulphur trioxide may be fractionally condensed from the gas mixture by cooling the gas mixture without liquefying any substantial quantity of the chlorine. Also, by suitably cooling the mixture the sulphur trioxide may be caused to separate as a solid phase. Under the influence of suitable pressures the sulphur trioxide may be caused to separate out in either the liquid or solid form concurrently with the formation of liquid chlorine.

The formation of the separate phases admits of an ease of separation not possible with condensed mixtures of sulphur dioxide and chlorine, which can only be separated by fractional distillation. Thus, by first converting the sulphur dioxide to sulphur trioxide a sulphur trioxide-rich phase, either liquid or solid, may be separated by gravity, by centrifuging, by filtration, or by any well-known method of separating liquids or solids from immiscible fluids. Thus, a relatively pure sulphur trioxide suitable for recycling for reaction with sodium chloride is obtained directly without the necessity of further processing.

The invention may be more fully understood by reference to the accompanying drawing in which Figure 1 is a flow sheet illustrating one modification and Figure 2 is a flow sheet illustrating another modification of the invention.

In carrying out the processes of my invention I first cause sulphur trioxide to act on salt in a suitable reactor 1 in a manner such that the products are sodium sulphate, sulphur dioxide, and chlorine. This reaction may be carried out in a single step at a temperature above about 450°

C., in which case the reaction may be represented as 2NaCl+2SO₃→Na₂SO₄+SO₂+Cl₂ or the reaction may be carried out in two stages in which sodium chlorosulphonate is first formed by reacting sulphur trioxide and salt at a temperature not exceeding about 150° C. and preferably below about 100° C. and then decomposed by heating into sodium sulphate, sulphur dioxide and chlorine.

The sulphur dioxide-chlorine mixture thus obtained is diluted with oxygen as shown at 2 in the amount required to give the desired SO₂/O₂ ratio for efficient conversion of the sulphur dioxide to sulphur trioxide and so much diluent gas, preferably chlorine recycled from a subsequent step in the process, to give an SO₂ concentration commensurate with the capability of the converter unit 3 to dissipate the heat of the reaction. This gas mixture is then exposed in the converter unit 3 to a catalyst or oxidation promoter under conditions adapted to promote the oxidation of sulphur dioxide to sulphur trioxide.

The amount of oxygen introduced should be kept to a minimum since any unreacted oxygen passing thru the converter will have to be separated in a subsequent step. Preferably, oxygen is added in an amount sufficient that the molal ratio of sulphur dioxide to oxygen is not substantially less than 1 and not substantially greater than 2. It may be desirable, however, in some cases to operate with a deficiency of oxygen, especially since small amounts of sulphur dioxide may be more readily separated from chlorine than small amounts of oxygen as will be pointed out more particularly hereinafter.

The gas mixture emanating from the converter will consists predominately of sulphur trioxide and chlorine together with minor amounts of oxygen and/or sulphur dioxide. The composition of this mixture will depend not only upon the sulphur dioxide to oxygen ratio and the efficiency of the converter but also upon the amount of diluent gas (recycled chlorine) introduced. In general, the components of the system other than sulphur dioxide and chlorine will not exceed more than about twenty per cent by volume and preferably these components are desirably held to less than about five per cent by volume.

The converter gases are then cooled in a suitable cooler 4 with the application of pressure if necessary by a suitable compressor unit 5 as shown in Figure 1 to cause the precipitation of a sulphur trioxide-rich phase either in the liquid or solid state, or both. The precipitated sulphur trioxide is separated in any suitable manner as in the condenser 6 and recycled to the reactor 1 through line 7 for interaction with more sodium chloride. A portion of the chlorine-rich component thus recovered can be recycled to the conversion for dilution of the sulphur trioxide concentration. The presence of oxygen, sulphur dioxide or sulphur trioxide is not objectionable except as excessive quantities of the latter two may affect the efficiency of the process. The remainder of the chlorine-rich component may be treated to recover chlorine in a suitably pure state.

If the chlorine-rich component exists in the gas phase chlorine may be recovered by liquefaction and fractionation under pressure, as illustrated in Figure 2. In this modification of the invention precipitation of the sulphur trioxide-rich phase is obtained largely by cooling, although as already pointed out pressure may also be employed. After the sulphur trioxide-rich phase is separated, as for example in the condenser 6, the chlorine-rich gas is passed on to the compressor unit 5 for liquefaction and the liquid so obtained is fractionated in the fractionating column 8. If the chlorine-rich component exists in a liquid state chlorine can be extracted in the same manner, according to the modification shown in Figure 1. In this case a compressor unit 5 is located between the cooler 4 and the condenser 6 in order to provide sufficient pressure to liquefy the chlorine-rich component in the condenser 6. The liquid chlorine-rich component is withdrawn into the fractionating column 8 where the chlorine is recovered substantially free of sulphur oxide. In case that the chlorine-rich component exists in the liquid state the separation of the sulphur trioxide-rich component can be made in the fractionating column 8.

Whenever chlorine is contaminated with small quantities of sulphur trioxide or sulphur dioxide these impurities can be removed by scrubbing with suitable absorbents or by contact with suitable adsorbents. Sulphur trioxide, for example, may be absorbed preferably below 100° C. in sulphuric acid, by sodium chloride, by sodium sulphate or other absorbents. Sulphur dioxide similarly may be absorbed, but in the presence of water and chlorine a reaction takes place yielding sulphuric acid and hydrochloric acid, and in the presence of activated carbon the sulphur dioxide and chlorine are combined to sulphuryl chloride. If oxygen or other inert gases are present they may be separated by liquefaction and fractionation, by preferential absorption, or by any other suitable process.

By means of my invention I am able to obtain chlorine and sodium sulphate by the direct action of sulphur trioxide upon sodium chloride and avoid the difficulties which have heretofore attended the separation of the highly reactive mixture of sulphur dioxide and chlorine obtained in this reaction. By first converting the sulphur dioxide to sulphur trioxide I provide a mixture which on being cooled separates into readily separable and distinct phases and thereby provides means whereby relatively pure sulphur trioxide is recovered for return to the main reaction with sodium chloride in a simple and economic manner.

I claim:

1. In the manufacture of chlorine and sodium sulphate the method which comprises causing sulphur trioxide to act on sodium chloride in a manner such that the products are sodium sulphate, sulphur dioxide and chlorine, isolating the solid products from the gaseous mixture of sulphur dioxide and chlorine, passing said gaseous mixture in admixture with oxygen at a reactive temperature in contact with a substance adapted to promote the formation of sulphur trioxide, the amount of oxygen being such as to give a molal SO₂:O₂ ratio of not substantially less than 1 and not substantially greater than 2, cooling the resulting gases under pressure sufficient to cause the formation of two phases one of which is rich in sulphur trioxide and the other of which is rich in chlorine, separating the two phases, returning the sulphur trioxide-rich phase to provide sulphur trioxide for the initial reaction, and subjecting the chlorine-rich fraction to fractionation to recover chlorine.

2. In the manufacture of chlorine and sodium sulphate the method which comprises causing sulphur trioxide to act on sodium chloride in a manner such that the products are sodium sulphate, sulphur dioxide and chlorine, isolating the solid products from the gaseous mixture of sulphur dioxide and chlorine, passing said gas mixture in admixture with oxygen at a reactive temperature in contact with a substance adapted to promote the formation of sulphur trioxide, cooling the resulting gases under pressure sufficient to cause the formation of two phases one of which is rich in sulphur trioxide and the other of which is rich in chlorine, the conditions of temperature and pressure being such that the chlorine-rich phase is a liquid, separating the chlorine-rich liquid, and subjecting it to fractionation to recover chlorine therefrom essentially free of sulphur trioxide.

3. In the manufacture of chlorine and sodium sulphate the method which comprises causing sulphur trioxide to act on sodium chloride in a manner such that the products are sodium sulphate, sulphur dioxide and chlorine, isolating the solid products from the gaseous mixture of sulphur dioxide and chlorine, passing said gas mixture in admixture with oxygen at a reactive temperature in contact with a substance adapted to promote the formation of sulphur trioxide, cooling the resulting gases under pressure sufficient to cause the formation of two phases one of which is rich in sulphur trioxide and the other of which is rich in chlorine, the conditions of temperature and pressure being such that the chlorine-rich phase is a gaseous mixture, separating the two phases, cooling the chlorine-rich gaseous mixture thus obtained under pressure sufficient to liquefy it, and subjecting the liquid thus obtained to fractionation to recover chlorine essentially free of sulphur trioxide.

4. In the manufacture of chlorine and sodium sulphate the method which comprises causing sulphur trioxide to react with sodium chloride in a manner such that the products are sodium sulphate, sulphur dioxide and chlorine, isolating the solid products of the reaction from the gaseous mixture of sulphur dioxide and chlorine, treating said gaseous mixture catalytically to convert its sulphur dioxide to sulphur trioxide, treating the resulting mixture to separate the chlorine and the sulphur trioxide, and recycling the sulphur trioxide thus recovered for reaction with sodium chloride.

5. In a process for separating equimolecular mixtures of sulphur dioxide and chlorine the method which comprises treating the mixture to oxidize the sulphur dioxide to sulphur trioxide, cooling the gas mixture thus obtained under pressure sufficient to cause the formation of two phases one of which is rich in sulphur trioxide and the other of which is rich in chlorine, and subjecting the chlorine-rich phase to fractionation to recover chlorine essentially free of sulphur trioxide.

6. In a process for separating equimolecular mixtures of sulphur dioxide and chlorine the method which comprises treating the mixture to oxidize the sulphur dioxide to sulphur trioxide, cooling the gas mixture thus obtained under pressure sufficient to cause the formation of two phases one of which is rich in sulphur trioxide and the other of which is rich in chlorine, the conditions of temperature and pressure being so regulated that the chlorine-rich phase is a liquid, separating this chlorine-rich liquid and subjecting it to fractionation to recover chlorine essentially free of sulphur trioxide.

7. In a process for separating equimolecular mixtures of sulphur dioxide and chlorine the method which comprises treating the mixture to oxidize the sulphur dioxide to sulphur trioxide, cooling the gas mixture thus obtained under pressure sufficient to cause the formation of two phases one of which is rich in sulphur trioxide and the other of which is rich in chlorine, the conditions of temperature and pressure being such that the chlorine-rich phase is a gaseous mixture, cooling the chlorine-rich gaseous mixture thus obtained under pressure sufficient to liquefy it, and subjecting the liquid thus obtained to fractionation to recover chlorine essentially free of sulphur trioxide.

RALPH K. ILER.